United States Patent [19]

Strich

[11] 4,149,215

[45] Apr. 10, 1979

[54] ELECTRICAL TERMINAL UNIT WITH FUSE AND INTERCHANGEABLE NEON LAMP

[75] Inventor: Werner Strich, Detmold, Fed. Rep. of Germany

[73] Assignee: C. A. Weidmüller KG, Detmold, Fed. Rep. of Germany

[21] Appl. No.: 842,826

[22] Filed: Oct. 17, 1977

[30] Foreign Application Priority Data

Oct. 15, 1976 [DE] Fed. Rep. of Germany ....... 2646611

[51] Int. Cl.[2] ............................................... H02B 1/04

[52] U.S. Cl. .................................... 361/331; 361/430; 337/242

[58] Field of Search ........................... 339/113 L, 147; 361/331, 334, 357, 380, 417, 426, 430, 104; 337/241, 242; 340/250, 256

[56] References Cited

U.S. PATENT DOCUMENTS

| | | | |
|---|---|---|---|
| 2,742,545 | 4/1956 | Sundt | 337/242 |
| 3,319,030 | 5/1967 | Russenberger | 337/242 |
| 3,685,049 | 8/1972 | Immel | 340/250 |

FOREIGN PATENT DOCUMENTS

| | | | |
|---|---|---|---|
| 990762 | 9/1951 | France | 337/242 |
| 318996 | 9/1930 | United Kingdom | 337/242 |

*Primary Examiner*—Gerald P. Tolin
*Attorney, Agent, or Firm*—Pollock, Vande Sande & Priddy

[57] ABSTRACT

A fused electrical terminal unit has a neon indicator lamp in parallel with the fuse, the lamp being mounted in a bayonet-fitting hole in a connector bar of the unit and being connected by a spring to the other connector bar of the unit.

8 Claims, 2 Drawing Figures

ELECTRICAL TERMINAL UNIT WITH FUSE AND INTERCHANGEABLE NEON LAMP

The invention relates to an electrical terminal unit with a fuse and a neon lamp which is interchangeably connected, separate of the fuse, between connector bars of the terminal unit.

In a known fused terminal of the kind described above which is constructed as a block terminal for wiring systems, the neon lamp, provided for indicating a blown fuse and having a large series resistance, is variably connected parallel with the fuse and separately thereof. The neon lamp is part of a separate insert comprising a casing which is longitudinally divided and is equipped with contact springs. Such construction is disclosed in German Published Application No. 1,939,953.

With this construction the entire expensive insert must be replaced by a new insert in the event of the neon lamp being damaged.

It is the object of the present invention to construct a fused terminal unit of the kind described hereinbefore so that when required it is merely necessary for a normal commercial neon lamp to be exchanged.

The present invention provides an electrical terminal unit comprising an insulating casing, terminals in the casing with respective conductive connector bars for interconnecting the terminals, first mounting means for mounting a fuse in the unit whereby said fuse will interconnect the said bars and hence the terminals, second mounting means for removably mounting an indicator lamp in the unit whereby said lamp will be connected between the said bars, the second mounting means comprising a holder provided in a first said bar and adapted to receive a cap of said lamp, and a contact resiliently mounted on a second said bar and arranged to engage a contact stud of said lamp when received in the said holder.

The present invention also provides an electrical terminal unit with a fuse and a neon lamp which is removably inserted, separately of the fuse, between the connector bars of the unit while establishing contact therewith, characterised in that the first connector bar has a holder for the cap of the neon lamp, and the neon lamp is retained in the holder by means of a spring which bears in contact-establishing manner on the second connector bar.

Commercial neon indicator lamps with a built-in series resistance intended for monitoring purposes can be used with the terminal units according to the invention. Such neon lamps have caps provided with two oppositely disposed detent pins, and a single central contact stud. Despite the presence of the holder for the neon lamp, the connector bar still remains simple. The spring which retains the commercial neon lamp in the holder also provides in a simple manner the element which establishes contact with the second connector bar. When the lamp is damaged or defective, it is only necessary to replace it by a new lamp; there is no special insert or casing to be replaced.

Preferably the bottom of the first connector bar has two recesses for the pins of the neon lamp cap, disposed on the circumference of the insertion opening for the neon lamp, and furthermore contains two insertion guide slots for the pins, circumferentially offset from said recesses. A holder of this kind can be produced in a bar inexpensively with the simplest possible means.

The terminal unit may have a guide surface which guides the neon lamp to its limiting position in the holder. Space for exchanging the neon lamp is frequently limited, more particularly in the case of wiring system block terminals which are arranged closely adjacent to one another in control cabinets in which they are frequently situated in recesses which are not readily accessible. The guide surface assures in conjunction with the contact establishing spring, a quasi-automatic guiding of the neon lamp into its limit position in the holder, so that the lamp can be readily inserted even in very confined situations. Preferably the guide surface is orientated towards the pin-locating recess of the first bar and is disposed in a recess of the insulating material casing which recess receives the neon lamp.

One embodiment of the invention is described hereinbelow by reference to the accompanying drawing in which.

Figure 1:
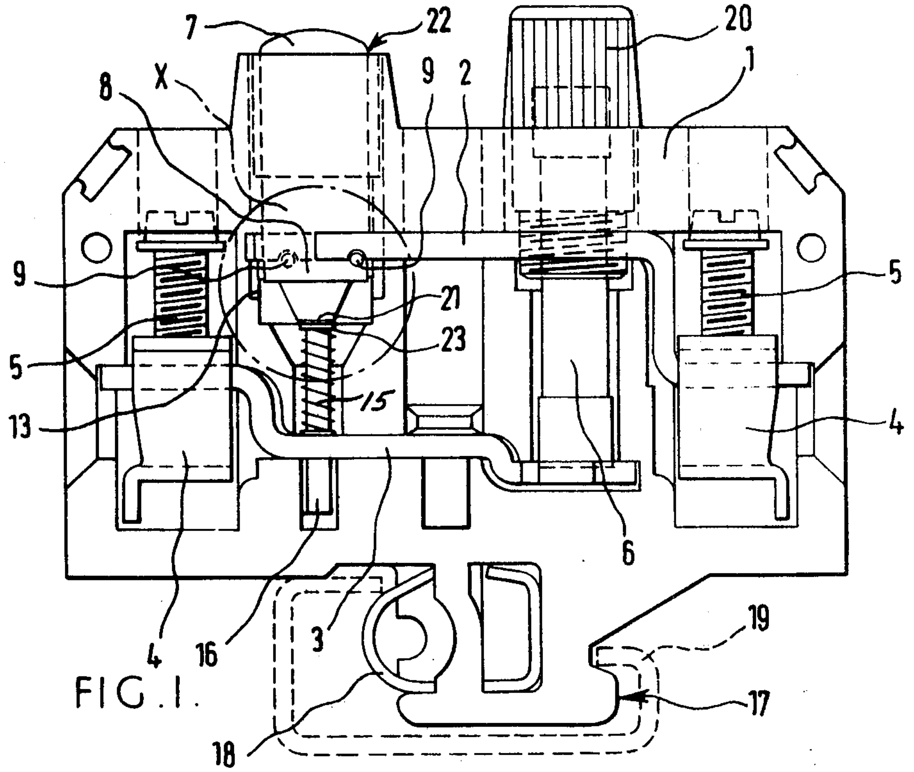
FIG. 1 is a side view, a fused terminal unit according to the invention.

FIG. 1 shows a terminal unit of the well known clip-on kind, comprising a generally rectangular slab-shaped casing 1 of molded plastic material with an integral foot 17 provided with a detent spring 18 whereby the casing can be clipped onto and unclipped from a flanged channel-section metal supporting rail 19. However, it is to be noted that the invention is not restricted to clip-on terminal units.

One of the major side faces of the housing has recesses for insertion of the terminal components. The latter include conventional terminal clamping sleeves 4 with clamping screws 5 for clamping electrical conductors.

Each terminal is associated with a respective metal connector bar of which one end extends into the associated terminal sleeve for clamping against a conductor inserted into the latter. A first or upper connector bar 2 overlies the second, lower, connector bar 3, with a gap between the bars. This gap is bridged by a cartridge fuse 6 which carries the current through the terminal unit in normal operation. The lower end of the fuse rests against the lower bar 3, and the upper end of the fuse is in a screw cap 20 which is screwed into the upper bar 2 and connects the fuse to the latter. Cap 20 and hence the fuse are accessible even when a plurality of terminal units are mounted side by side, so that the fuse can be changed if it is blown by an excessive current flow through the terminal unit.

A neon indicator lamp 7 is also mounted in the terminal unit and is connected in parallel with the fuse 6, so that, when the fuse is blown, the potential difference which will then exist between the connector bars will be applied to the lamp, which will therefore glow and indicate that the fuse has blown. The lamp incorporates a large series resistance so that the current flowing through it will be very small. As long as the fuse is sound, there will be no potential difference across the lamp and the lamp will therefore not glow.

The lamp is connected to the bars 2, 3 quite separately from the fuse. It is an ordinary commercially available neon lamp with a built-in series resistor and a bayonet cap 8 provided with a pair of diametrically opposite radial detent pins 9. The cap and pins are of metal and constitute one terminal of the lamp. The other terminal is a single center contact stud 21. The lamp is accommodated in a bore 22 in the insulating casing adjacent to the bore provided to receive the cap 20 and fuse, so that the lamp 7 is visible beside the fuse cap to which it relates.

Figure 2:
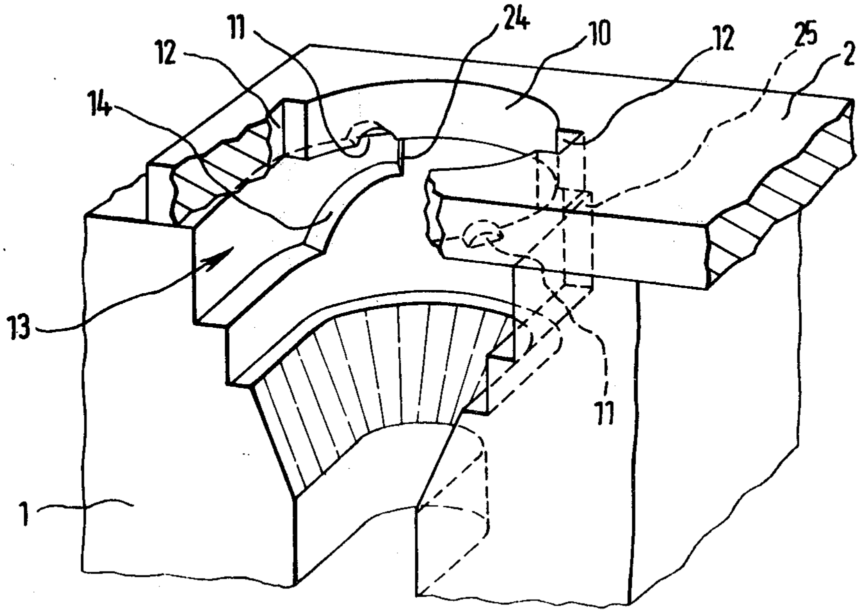
FIG. 2 shows the detail X of the fuse terminal according to FIG. 1, in perspective view and to an enlarged scale.

The upper connector bar 2 is provided with a holder for the lamp cap 8. More specifically, as shown in detail in FIG. 2, the bar has a circular opening 10 into which the lamp cap is inserted. Diametrically opposite slots 12 in the circumference of the opening permit passage of the pins 9. In the underside of the bar, facing the bar 3, are diametrically opposite recesses 11 at the circumference of the opening 10 and circumferentially offset from the slots 12. These recesses 11 serve to locate the pins 9 after the latter have been inserted through the slots 12 and the lamp has been rotated within the opening 10, so that the lamp is then captive in the opening 10 in the manner of a bayonet coupling.

A contact pin 16 extends through and is slidable in the lower connector bar 3 and has at its upper end a head 23 which makes electrical contact with the central contact stud 21 of the lamp. The head 23 is thrust against the stud 21 by a coil compression spring 15 which encircles the pin 16 and acts between the head 23 and the bar 3. The pin 16 and spring 15 therefore serve to establish electrical contact between the lamp and the lower connector bar 3, and also to thrust the lamp 7 upwardly so that its pins 9 are held firmly in place against the underside of the upper connector bar 2, in the locating recesses 11. It should be noted that the pin 16 is not essential, and the spring alone could be used to provide electrical connection between the lamp and the lower connector bar as well as to thrust the lamp upwards.

The insulating casing has a generally U-section recess 13 which accommodates the lower end of the neon lamp, below the upper connector bar 2. The sides of this recess are stepped to accommodate the pins 9 during movement of these between the slots 12 and recesses 11. One of the stepped regions is provided with a guide surface 14 which extends obliquely upwards from a position below one of the slots 12 to a position below the associated recess 11, and faces the underside of the connector bar 2. This guide surface guides into the recess 11 the pin 9 inserted through the associated slot 12. Adjacent this recess 11 is a stop surface 24 so that the pin cannot be inadvertently moved past the recess 11. The other slot 12 is adjacent to a stop surface 25 of the recess 13, so that when the lamp is inserted it cannot be inadvertently turned in the wrong direction for locking, and when it is to be removed it is automatically located with its pins in line with the slots 12. The provision of the guide surface 14 and the stop surfaces 24, 25 greatly facilitates the insertion and removal of lamps in confined situations.

It is not essential that the opening 10 should completely surround the lamp. The circumferential extent of the opening 10 must be enough to accommodate the slots 12 and recesses 11, but it is possible to omit part of the side region of the bar 2 between a slot 12 and the recess 11 not directly associated therewith. For example, that part of the bar 2 shown broken away in FIG. 2 could in fact be omitted without impairing the security of the neon lamp, which is also located laterally by the insulating casing.

I claim:

1. An electrical terminal unit comprising an insulating casing having first and second connector bars, a fuse having two terminals, each connected to a respective connector bar, first mounting means mounting said fuse in the unit whereby said fuse interconnects said bars and hence said terminals, an indicating lamp having two terminals, and second mounting means removably mounting said indicator lamp in the unit whereby aid lamp is connected between said bars, said second mounting means comprising a holder provided in a first said bar and receiving a cap of said lamp, and a contact resiliently mounted on a second said bar and engaging a contact stud of said lamp.

2. An electrical terminal unit comprising an insulating casing and having first and second connector bars, a fuse having two terminals each connected to a respective connector bar, first mounting means mounting said fuse in said unit whereby said fuse interconnects said bars and hence said terminals, an indicator lamp having a cap having radial detent pins, and second mounting means for removably mounting said indicator lamp in said unit whereby said lamp is connected between said bars, said second mounting means comprising a circular opening provided in a first connector bar and receiving said cap of said lamp and said second mounting means having slots for passage of said radial detent pins and a contact resiliently mounted on a second said bar and engaging a contact stud of said lamp.

3. A terminal unit as claimed in claim 2, wherein said first bar is provided with recesses adjoining said opening, for locating said pins, said recesses being spaced from said slots about the circumference of said opening, and at least one guide surface in said casing for guiding at least one said pin from a said slot to an adjoining locating recess.

4. An electrical terminal unit having first and second connector bars a fuse having two terminals, each connected to a respective connector bar, and a removable neon lamp having a cap, the lamp being inserted, separately of the fuse, between said first and second connector bars while establishing contact therewith, wherein said first connector bar has a holder for said cap, and including spring means retaining said neon lamp in said holder, said spring bearing in contact-establishing manner on said second connector bar.

5. A terminal unit according to claim 4, characterised by the provision of guide surface which guides the cap of the neon lamp into its limiting position in the holder.

6. An electrical terminal unit having first and second connector bars, a fuse having two terminals, each connected to a respective connector bar, and a removable neon lamp having a bayonet cap having bayonet-fastening pins, said lamp being inserted, separately of said fuse, between said first and second connector bars while establishing contact therewith, wherein said first connector bar has an insertion opening receiving said cap of said neon lamp and the bottom of said first bar is provided, on the circumference of said insertion opening, with two recesses for locating said bayonet-fastening pins, and two guide slots extend through said first bar in a configuration which is circumferentially offset from said recesses, and a spring retaining said neon lamp in said holder, said spring bearing in contact-establishing manner on said second connector bar.

7. A terminal unit according to claim 6, including a guide surface for guiding said cap of said neon lamp into its limiting position in said holder.

8. A terminal unit according to claim 7, including an insulating casing for said unit, and wherein said guide surface is disposed in said casing in the recess thereof which accommodates said neon lamp and extends towards the said recesses of said first bar.

* * * * *